United States Patent [19]
Denning

[11] Patent Number: 6,135,580
[45] Date of Patent: *Oct. 24, 2000

[54] HYDRAULICALLY ACTUATED POWER BRAKING APPARATUS AND METHOD FOR USE WITH A MOVING VEHICLE

[75] Inventor: Joel Denning, Raleigh, N.C.

[73] Assignee: Caterpillar Inc., Peoria, Ill.

[*] Notice: This patent is subject to a terminal disclaimer.

[21] Appl. No.: 09/045,527

[22] Filed: Mar. 20, 1998

[51] Int. Cl.$^7$ .................................................. F16P 31/02
[52] U.S. Cl. ......................... 303/151; 303/117.1; 60/436
[58] Field of Search ................................ 303/151, 117.1, 303/119.2; 60/436, 491, 443, 444, 492, 494, 490, 487; 91/505

[56] References Cited

U.S. PATENT DOCUMENTS

| | | | |
|---|---|---|---|
| 3,561,212 | 2/1971 | Pinkerton et al. | 60/492 |
| 3,988,893 | 11/1976 | Bojas et al. | 60/466 |
| 4,088,208 | 5/1978 | Goode . | |
| 4,496,035 | 1/1985 | Wanie . | |
| 4,543,786 | 10/1985 | Shuler | 60/436 |
| 4,562,906 | 1/1986 | Barbagli et al. . | |
| 5,020,649 | 6/1991 | Eastcott | 192/48.1 |
| 5,279,122 | 1/1994 | Shirai et al. | 60/452 |
| 5,445,447 | 8/1995 | Farr et al. | 303/117.1 |
| 5,447,029 | 9/1995 | Swick et al. | 60/452 |
| 5,474,371 | 12/1995 | Shinomiya | 303/117.1 |
| 5,509,729 | 4/1996 | Zaviska et al. | 303/117.1 |
| 5,626,403 | 5/1997 | Beck et al. | 303/117.1 |
| 5,897,176 | 4/1999 | Dvorak et al. | 303/151 |

FOREIGN PATENT DOCUMENTS

| | | | |
|---|---|---|---|
| 0223686 | 5/1987 | European Pat. Off. | B60K 41/26 |
| 2324480 | 9/1975 | France | B60K 41/00 |
| 2407846 | 11/1977 | France | B60T 13/14 |
| 1491046 | 11/1977 | United Kingdom . | |
| 2244748 | 11/1991 | United Kingdom | E01H 1/04 |
| WO 97/33782 | 9/1997 | WIPO . | |

OTHER PUBLICATIONS

Two pages from the Mannesmann Rexroth Sales Brochure, descriging DA Hydraulic Control Speed Dependent Variable Displacement Pump AA4VG, Series 3.

*Primary Examiner*—Robert J. Oberleitner
*Assistant Examiner*—Robert A. Siconolfi
*Attorney, Agent, or Firm*—Bradford G. Addison

[57] ABSTRACT

A braking apparatus includes a brake cylinder having a first brake opening and a second brake opening defined therein. The first brake opening is adapted to allow a flow of brake fluid to enter the brake cylinder and the second brake opening is adapted to allow the flow of brake fluid to exit the brake cylinder. The braking apparatus also includes a first transmission opening and a second transmission opening defined in the brake cylinder. The first transmission opening is adapted to allow a flow of transmission fluid to enter the brake cylinder and the second transmission opening is adapted to allow the flow of transmission fluid to exit the brake cylinder. The braking apparatus further includes a movable member located within the brake cylinder. The movable member is positionable between a first position and a second position, wherein the movable member (i) prevents fluid communication between the first brake opening and the second brake opening when located in the first position, and (ii) allows fluid communication between the first brake opening and the second brake opening when located in the second position. In addition, the movable member (i) prevents fluid communication between the first transmission opening and the second transmission opening when located in the first position, and (ii) allows fluid communication between the first transmission opening and the second transmission opening when located in the second position. A method for reducing travel speed of a vehicle which utilizes the above braking apparatus is also disclosed.

16 Claims, 7 Drawing Sheets

HYDRAULICALLY ACTUATED POWER BRAKING APPARATUS AND METHOD FOR USE WITH A MOVING VEHICLE

CROSS REFERENCE

Cross reference is made to copending U.S. patent application Ser. No. 08/616,548, entitled "Braking Apparatus and Method for Use with a Moving Vehicle" by Peter Robert Hildner, William Chris Swick, Dave Paul Smith, and Paul Anthony Dvorak, filed Mar. 15, 1996 which is assigned to the same assignee of the present invention.

TECHNICAL FIELD OF THE INVENTION

The present invention generally relates to a braking apparatus and method for use with a moving vehicle. The present invention particularly relates to a braking apparatus and method which slows down a moving vehicle by neutralizing an associated hydrostatic transmission prior to actuating a power brake system of the vehicle.

BACKGROUND OF THE INVENTION

Many earth moving machines, such as front end loaders, employ a hydrostatic transmission for propulsion. However, it is also known that operating the hydrostatic transmission in a certain manner can assist in braking or stopping the machine. One such method incorporates an "inching valve" in fluid communication with the hydrostatic transmission. When activated the "inching valve" bleeds off a volume of hydrostatic fluid from the hydrostatic transmission, which in turn causes a temporary reduction in a hydrostatic control pressure of the system. This decrease in control pressure causes an appropriate controller component to "destroke" or neutralize the hydrostatic transmission. A hydrostatic transmission in a "destroked" or neutralized mode delivers a reduced amount of driving force to the vehicles wheels, and thus assists in braking or stopping the vehicle.

One prior art approach to coordinate an "inching valve's" function (and therefore a "destroking" of the hydrostatic transmission) with a conventional braking system of a vehicle has been to mechanically link the "inching valve" to a separate braking element, such as a piston in the master cylinder of a hydraulic braking system. This mechanical linkage allows the "inching valve" to become activated upon actuation of the braking element. However, this approach has the disadvantage of requiring precise tolerances between the parts mechanically interposed between the "inching valve" and the braking element to ensure that the destroking function is initiated before a set of brake pads or shoes engage a disk or drum of the braking system. If the timing is not appropriately set by the mechanical linkage, for example if the "destroking" function occurs at a point in time slightly after actuation of the braking system, the hydrostatic transmission will be operating to propel the vehicle forward at the same time the braking system is attempting to slow down the vehicle. The situation results in results in excessive brake pad wear and deterioration. An additional disadvantage of utilizing a mechanically linked "inching valve" is that it requires additional parts to link the elements. These additional parts add unnecessary bulk and cost to the braking apparatus of the vehicle.

Therefore, in light of the above discussion, it is apparent that an apparatus and method for coordinating the destroking of a hydrostatic transmission with a power or conventional braking system is desirable. The present invention provides such an apparatus in the form of an inching valve integrated with a braking element, such as a piston or spool in a hydraulic braking system. One advantage of the present invention is that the timing of the destroking (or neutralization) function is not dependent upon the tolerances of mechanically interposed parts. Moreover, an inching valve integrated with a braking element eliminates the need for mechanical linking elements which add to the cost and bulk of a braking system.

DISCLOSURE OF THE INVENTION

In accordance with one embodiment of the present invention, there is provided a braking apparatus which includes a brake cylinder having a first brake opening and a second brake opening defined therein. The first brake opening is adapted to allow a flow of brake fluid to enter the brake cylinder and the second brake opening is adapted to allow the flow of brake fluid to exit the brake cylinder. The braking apparatus also includes a first transmission opening and a second transmission opening defined in the brake cylinder. The first transmission opening is adapted to allow a flow of transmission fluid to enter the brake cylinder and the second transmission opening is adapted to allow the flow of transmission fluid to exit the brake cylinder. The braking apparatus further includes a movable member located within the brake cylinder. The movable member is positionable between a first position and a second position, wherein the movable member (i) prevents fluid communication between the first brake opening and the second brake opening when located in the first position, and (ii) allows fluid communication between the first brake opening and the second brake opening when located in the second position. In addition, the movable member (i) prevents fluid communication between the first transmission opening and the second transmission opening when located in the first position, and (ii) allows fluid communication between the first transmission opening and the second transmission opening when located in the second position.

According to another embodiment of the present invention, there is provided a method for reducing the travel speed of a vehicle, with the vehicle including (i) a brake cylinder having a first brake opening, a second brake opening, a first transmission opening, and a second transmission opening and (ii) a movable member which is positioned within the brake cylinder. The method includes the following steps. Moving the movable member to a first position, wherein the movable member (i) prevents fluid communication between the first brake opening and the second brake opening when located in the first position, and (ii) prevents fluid communication between the first transmission opening and the second transmission opening when located in the first position. The method also includes the steps of moving the movable member from the first position to the second position, wherein the movable member (i) allows fluid communication between the first brake opening and the second brake opening when located in the second position, and (ii) allows fluid communication between the first transmission opening and the second transmission opening when located in the second position.

BEST MODE FOR CARRYING OUT THE INVENTION

Figure 1:
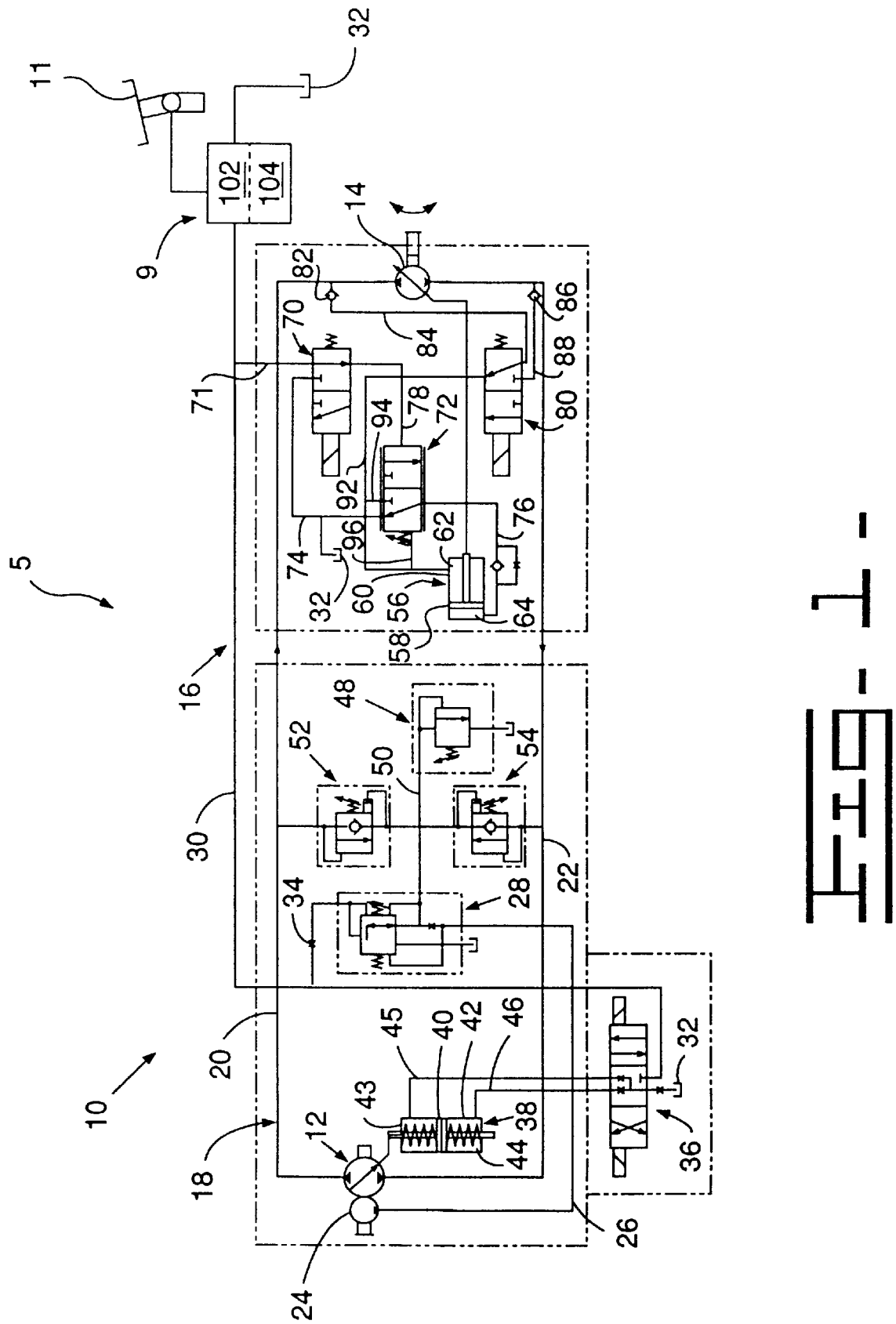
FIG. 1 is a schematic illustration of a first embodiment of a braking apparatus of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a schematic illustration of a braking apparatus 5 of the present invention. The braking apparatus 5 includes a hydrostatic transmission 10 and a hydraulic braking system 9. The hydraulic braking system 9 includes an actuating portion 102 (see FIGS. 2 and 3) and a force applying portion 104 (see FIG. 4). A foot pedal 11 is mechanically linked to the actuating portion 102. Moreover, a tank 32 is in fluid communication with the actuating portion 102.

The hydrostatic transmission 10 includes a variable displacement over-center pump 12 and a variable displacement motor 14 fluidly driven by the pump 12. The motor 14 will propel a vehicle (not shown) to a desired speed, in a manner well known in the art. A control circuit 16 is provided for controlling the displacement of the pump 12 and motor 14. It is noted that the hydrostatic transmission could have more than one pump or motor without departing from the braking apparatus of the present invention. A closed loop 18 has a first drive line 20 and a second drive line 22 for fluidly driving the motor 14 by pressurized fluid from the pump 12. An engine driven charge pump 24 supplies fluid to the control circuit 16. A line 26 connects the charge pump 24 to a pressure reducing valve 28. A common pressure control signal line 30 connects the valve 28 to the tank 32 for controlling the displacement of the pump 12 and the motor 14. An orifice 34 is positioned within the signal line 30 and, as is well known, is effective to create a pressure drop thereacross in response to the fluid flow therethrough. A three position directional control valve 36 is connected to the signal line 30 and to a pump displacement controller 38 for changing direction and displacement of the pump 12. The controller 38 includes a piston 40 slidably positioned within a housing 42 and is connected to the pump 12. The housing 42 has a first pressure chamber 43 and a second pressure chamber 44. A line 45 connects the valve 36 to the first pressure chamber 43. A line 46 connects the valve 36 to the second pressure chamber 44. The valve 36 is spring biased to a first centered operative position and movable to a second or third operative position in response to an electrical signal generated in response to the machine controls being moved to one of its forward or reverse operative positions. In the first operative position, fluid flow from signal line 30 is blocked. In the second operative position, the line 45 is in fluid communication with the signal line 30 and the line 46 is in communication with the tank 32. In the third operative position, the line 46 is in fluid communication with the line 30, and the line 45 is in fluid communication with the tank 32. A relief valve 48 is connected to the valve 28 by a line 50. A first relief and replenishing valve 52 is connected between the line 50 and the line 20. A second relief and replenishing valve 54 is connected between the line 50 and the line 22.

A motor displacement controller 56 is provided for changing the displacement of the motor 14. The motor controller 56 includes a piston 58 slidable positioned within a housing 60 and connected to the motor 14. The housing 60 has a first pressure chamber 62 and a second pressure chamber 64. A solenoid operated valve 70 is connected to the signal line 30 by a line 71. An infinitely positionable pilot operated valve 72 is connected to the first solenoid valve 70 and the tank 32 by a line 74 and to the second pressure chamber 64 of the controller 56 by a line 76. The valve 70 is connected to one end of the valve 72 by a line 78. A solenoid operated valve 80 is connected through a check valve 82 to the drive line 20 by a line 84 and connected through a check valve 86 to the drive line 22 by a line 88. The solenoid operated valve 80 is connected to the controller 56 by a line 92 and connected to the valve 72 by the line 92 and a line 94. A line 96 connects the line 92 to the other end of the valve 72. The solenoid operated valve 70 is a two-position valve spring biased to a first operative position at which the line 71 is in fluid communication with the line 78 and moveable in response to an electric signal to its second operative position at which the line 78 is in fluid communication with the tank 32 through the line 74. The pilot operated valve 72 is a spring biased two-position valve moveable from its first spring biased position at which the line 76 is in fluid communication with the tank 32 through the line 74 towards its second operative position at which the line 94 is in fluid communication with the line 76. The pilot operated valve 72 is moveable toward its second position in response to a pressure signal in line 78. The solenoid operated valve 80 is a two-position valve spring biased to a first operative position at which the line 94 is in fluid communication with the line 92 and moveable to its second operative position at which the line 88 is in fluid communication with the line 82. The solenoid operated valve 80 is movable to its second operative position in response to an electrical signal generated in response to the machine controls being moved to one of its forward or reverse operative positions.

Figure 2:
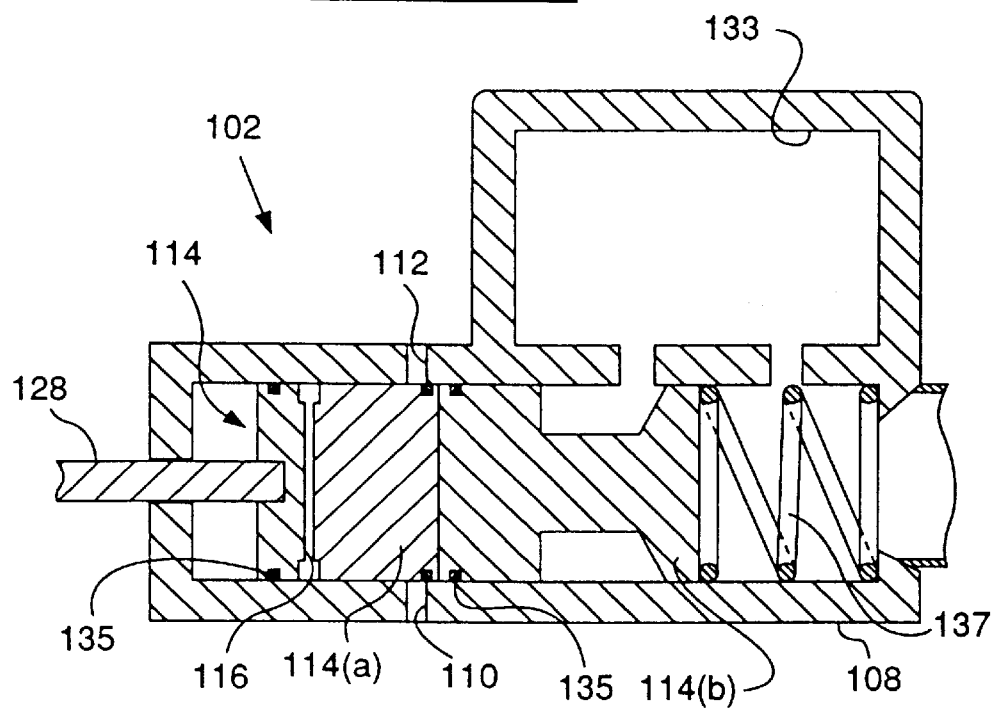
FIG. 2 is a cross-sectional view of the brake cylinder and piston of an actuating portion of a hydraulic brake system of the brake apparatus of FIG. 1, with the piston shown located in a first position.
Figure 3:
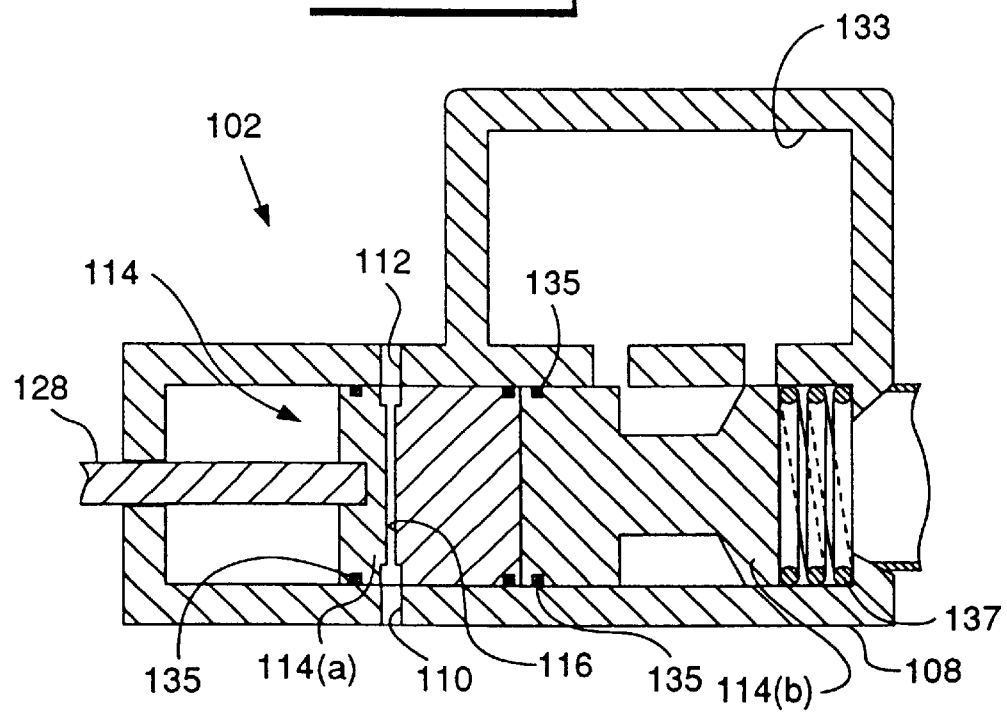
FIG. 3 is a view similar to FIG. 2, but with the piston shown located in a second position.

Referring now to FIGS. 2 and 3, the actuating portion 102 of the hydraulic braking system 9 includes a brake cylinder 108 having a first opening 110 and a second opening 112 defined therein. The brake cylinder 108 also has a brake fluid reservoir 133 attached thereto. The first opening 110 is in fluid communication with the signal line 30 of the hydrostatic transmission 10. The first opening 110 is adapted to allow fluid to enter the brake cylinder 108. The second opening 112 is in fluid communication with the tank 32. The second opening 112 is adapted to allow fluid to exit the brake cylinder 108. A piston 114 is positioned within the brake cylinder 108. Piston 114 is shown as having a first stage 114(a) and a second stage 114(b), however it should be understood that a single stage piston can also be used in the present invention. The piston 114 has a channel 116 defined therein which extends therethrough in a width-wise direction as shown in FIGS. 2 and 3. The piston 114 further includes three grooves which extend around the periphery of the piston as shown in FIGS. 2 and 3. Three sealing rings 135 are respectively positioned within the three grooves so as to prevent leakage of fluid out of the brake cylinder 108. The piston 114 is mechanically connected to a foot pedal 11 (not shown in FIGS. 2 and 3) via a rod 128. Actuation of the foot pedal 11 causes the piston 114 to move from a first position as shown in FIG. 2 to a second position as shown in FIG. 3.

When located in the first position (see FIG. 2), the piston 114 prevents fluid communication between the first opening 110 and the second opening 112. When the piston 114 is located in the second position (see FIG. 3), fluid communication is allowed between the first opening 110 and the second opening 112 through the channel 116.

Figure 4:
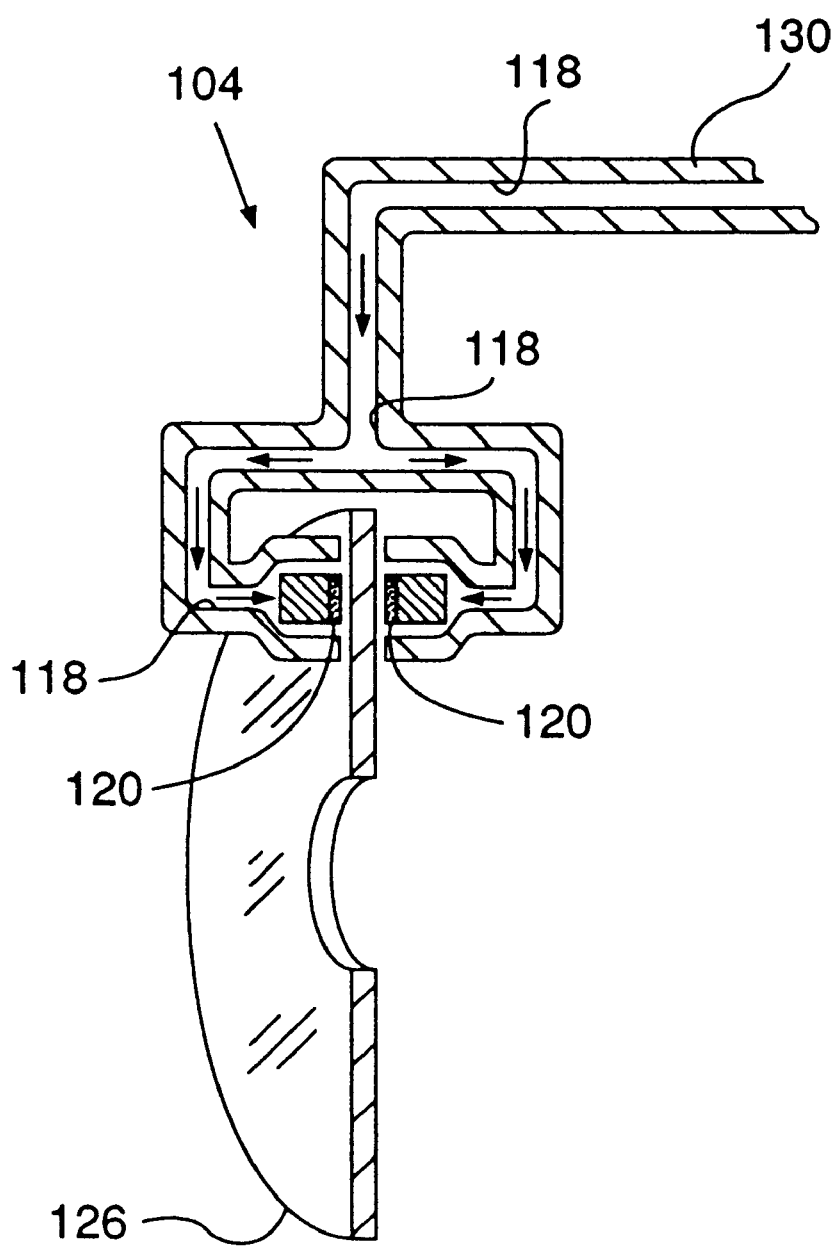
FIG. 4. is a cross-sectional view of a force applying portion of the hydraulic braking system of the brake apparatus of FIG. 1.

Referring now to FIG. 4, the force applying portion 104 of the hydraulic braking system 9 includes a conduit 130 which defines a brake chamber 118. A pair of brake pads 120 are movably mounted within the brake chamber 118. The brake chamber 118 is in fluid communication with the brake cylinder 108. The force applying portion 104 further includes a brake disk 126 against which the pair of brake pads 120 may be forced.

Actuation of the foot pedal 11 causes movement of the piston 114 from the first position as shown in FIG. 2 to the second position as shown in FIG. 3. As a result of the movement of the piston 114 in the above-described manner, fluid pressure within the brake chamber 118 increases so that the pair of brake pads 120 are forced against the brake disk 126. The brake disk 126 is linked to a wheel (not shown) of the vehicle (not shown) in a conventional manner. In operation, forcing the brake pads 120 against the brake disk 126 will reduce the travel speed of the vehicle (not shown).

When an operator is not applying force to the foot pedal 11, the piston 114 is normally biased by a spring 137 so as to maintain the piston 114 in the first position (see FIG. 2). So positioned, the signal line 30 is prevented from being in fluid communication with the tank 32.

The piston 114 is moved to the second position (see FIG. 3) in response to the application of force to the foot pedal 11 by an operator. With the piston 114 located in the second position, the signal line 30 is allowed to be in fluid communication with the tank 32.

During operation of the braking apparatus 5, the pump 12 supplies fluid flow to the motor 14, in a well known manner, for propelling the machine at a preselected travel speed. The pump 12 will supply fluid flow to the motor 14 through line 20. Fluid will be returned to the pump 12 through line 22 in one direction of operation. Fluid flow will be reversed in another direction of operation of the pump 12. The degree of operator input will determine the rate of speed.

When the foot pedal 11 is depressed, piston 114 is moved from its first position (see FIG. 2) to its second position (see FIG. 3) thereby allowing fluid communication between the signal line 30 and the tank 32 through channel 116. This causes fluid from the signal line 30 to enter the tank 32 thus creating a pressure drop in the signal line 30 downstream of the orifice 34. This reduction of the pressure in the signal line 30 causes the hydrostatic transmission to be destroked (or neutralized). In particular, this reduction moves the controller 38 to decrease the displacement of the pump 12 thus decreasing fluid and effectively allows the valve 72 to move to its first position thus moving the controller 56 to increase the displacement of the motor to slow the speed of the machine.

Movement of piston 114, due to force being applied to the foot pedal 11, from its first position (see FIG. 2) to its second position (see FIG. 3) provides two functions. Firstly, it causes destroking (or neutralization) of the hydrostatic transmission 10 as described above. Secondly, it causes the pair of brake pads 120 to be forced against the brake disk 126, also as described above.

An important aspect of the present invention is that the channel 116 becomes aligned with the first and second openings 110, 112 during movement of the piston 114 within the brake chamber 108 prior to the brake pads 120 being forced against the brake disk 126 due to an increase in fluid pressure in the brake chamber 118. This is important because this will ensure that neutralization of the hydrostatic transmission 10 occurs at a point in time prior to the brake pads 120 being forced against the brake disk 126. Consequently, this will prevent the hydrostatic transmission 10 for operating to propel the vehicle forward at the same time the braking system 9 is attempting to slow down the speed of the vehicle. Accordingly, excessive wear and deterioration of the brake pads will be prevented.

Referring now to FIGS. 5–8 there is shown a second embodiment of a braking apparatus of the present invention. The embodiment illustrated in FIGS. 5–8 has the same advantages as those discussed above in reference to FIGS. 1–4. In addition, the second embodiment of the braking apparatus illustrated in FIGS. 5–8 functions in a similar manner as that described above in reference to FIGS. 1–4 with the exception that actuating portion 102 has been replaced with a power brake apparatus 140 (see FIG. 5).

Figure 5:
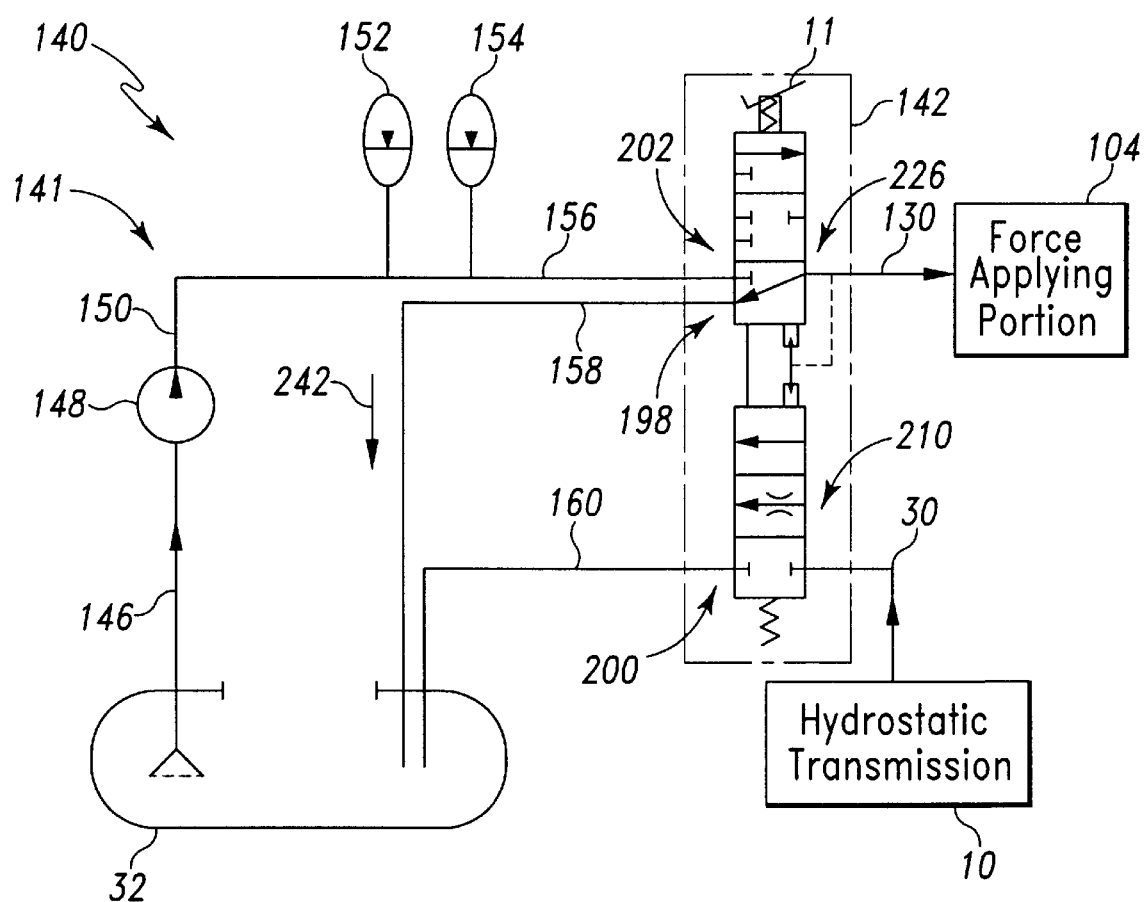
FIG. 5 is a schematic illustration of a second embodiment of a braking apparatus of the present invention.

As shown in FIG. 5, power braking apparatus 140 includes a fluid circuit 141 coupled to a valve assembly 142. As more clearly shown in FIGS. 6–8, valve assembly 142 includes a brake cylinder 162 having a passageway 180 extending therethrough and a movable assembly 230 disposed within passageway 180. Brake cylinder 162 also includes a tank port 198, transmission openings 200 and 210, and brake openings 202 and 226 defined therein. It should be understood that tank port 198, transmission openings 200 and 210, and brake openings 202 and 226 are all in fluid communication with passageway 180 of brake cylinder 162. Brake cylinder 162 further includes a check valve channel 220 leading from passageway 180 to tank port 198. Check valve channel 220 has a check valve 222 disposed therein which only allows a fluid flow from passageway 180 to tank port 198. Thus any hydraulic fluid trapped in passageway 180 and in fluid communication with check valve channel 220 will flow from passageway 180 to tank port 198.

Movable assembly 230 includes a shaft 168 and a plunger 166 having a cavity 172 defined therein by an inside wall 188. Movable assembly 230 also includes a boot 170, a retainer nut 164, a spring 174, an inner spring 186, and an alignment member 176. Movable assembly 230 also includes an upper spool 178 having a groove 182, a return channel 216, and a return port 218 each defined therein. Upper spool 178 also has blocking portions 236 and 238 defined thereon. Movable assembly 230 also includes a lower spool 204 having a groove 206 and a chamber 208 defined therein. Lower spool 204 also has a blocking portion 240 defined thereon. Movable assembly 230 further includes a spring 212 and an end cap 214 having a notch 232 defined therein. It should be understood that return channel 216 and port 218 allows any hydraulic fluid trapped between upper spool 178 and lower spool 204 to return to groove 182.

Figure 6:
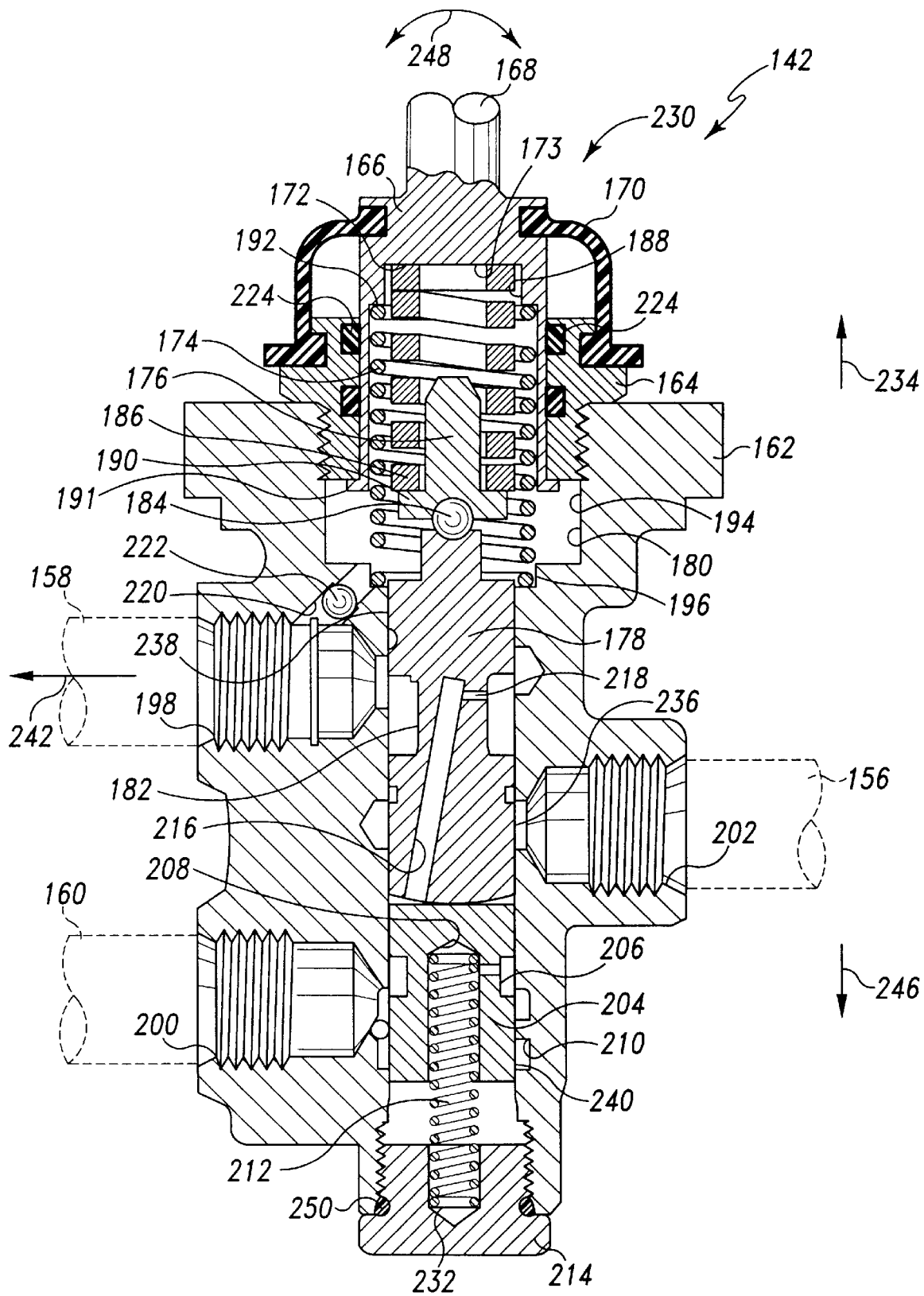
FIG. 6 is a cross-sectional view of the valve assembly of the braking apparatus of FIG. 5, with the movable member shown located in a first position (note that the drain line, the tank line, and the high pressure line are shown attached to the valve assembly in phantom for clarity of description)
Figure 7:
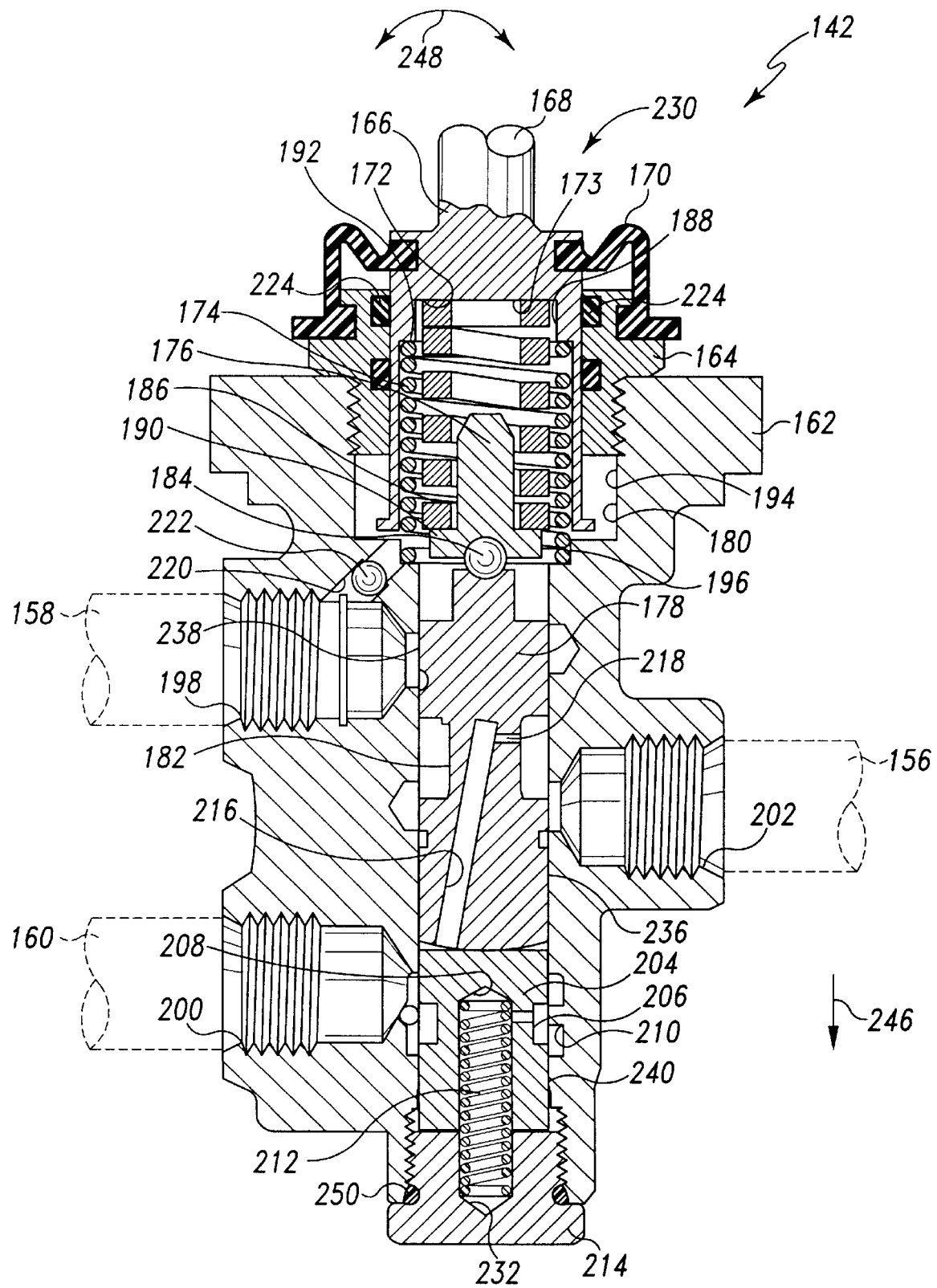
FIG. 7 is a view similar to FIG. 6, but with the movable assembly shown located in a second position.
Figure 8:
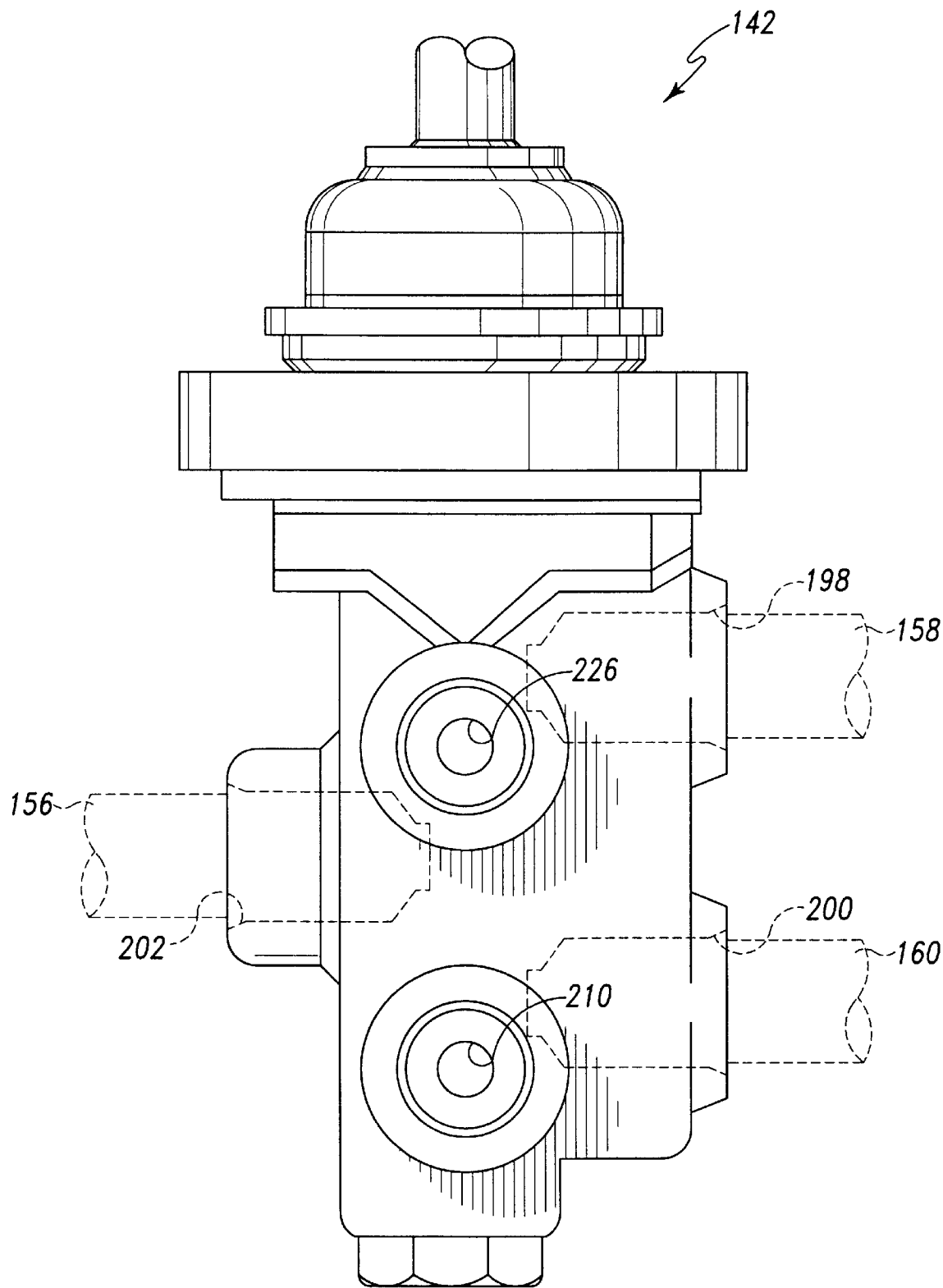
FIG. 8 is a side elevational view of the valve assembly of FIG. 5 showing the tank port, the brake openings and the transmission openings (note that the drain line, the tank line, and the high pressure line are shown attached to the valve assembly in phantom for clarity of description).

As shown in FIGS. 6 and 7, retainer nut 164 is threadingly engaged with an end of passageway 180 so as to secure retainer nut 164 to brake cylinder 162. One end of shaft 168 is attached to plunger 166. The other end of shaft 168 is mechanically coupled to foot pedal 11 (see FIG. 5). Plunger 166 is disposed within retainer nut 164 such that a shoulder 191 formed on an end of plunger 166 engages an end of retainer nut 164. A number of seals 224 are interposed between plunger 166 and retainer nut 164 such that a fluid impervious seal is created therebetween. One end of boot 170 is attached to retainer nut 164 while the other end of boot 170 is attached to plunger 166. Boot 170 can be made from any appropriate elastomeric material such as rubber. Spring 174 is positioned within passageway 180 such that an end of spring 174 extends into cavity 172 and rests on a shoulder 192 defined on an inside wall of 188 of plunger 166. Spring 174 is further positioned such that another end thereof rests on a shoulder 196 defined on an inner wall 194 of brake cylinder 162. Inner spring 186 is nested within spring 174 such that one end of inner spring 186 is in contact with a wall segment 173 of cavity 172. Inner spring 186 is further positioned such that another end thereof rests on a shoulder 190 extending from alignment member 176. Alignment member 176 is positioned within passageway 180 such that a portion of alignment member 176 is nested within inner spring 186 and extends into cavity 172 of plunger 166. Upper spool 178 is positioned within passageway 180 adjacent to alignment member 176. A roller bearing 184 is interposed between alignment member 176 and upper spool 178. Lower spool 204 is also positioned within passageway 180 adjacent to upper spool 178 such that upper spool 178 is interposed between alignment member 176 and lower spool 204. End cap 214 is threadingly engaged with the other end of passageway 180 so as to secure end cap 214 to brake cylinder 162. A seal 250 is interposed between end cap 214 and brake cylinder 162 so as to form a fluid impervious barrier therebetween. Spring 212 is positioned in passageway 180 so that a portion of spring 212 extends into a chamber 208 defined in lower spool 204. Spring 212 is further positioned within passageway 180 so that a portion of spring 212 extends into notch 232 defined end cap 214. Spring 212 urges lower spool 204 toward upper spool 178 to maintain contact therebetween.

As shown in FIG. 5, fluid circuit 141 includes tank 32, a hydraulic line 146, a pump 148, a hydraulic line 150, accumulators 152 and 154, and a high pressure line 156. Fluid circuit 141 also includes a drain line 158 and a tank line 160. Tank 32 is in fluid communication with valve assembly 142 so as to provide an operation fluid, such as hydraulic fluid (e.g. brake or transmission fluid), thereto. In particular, tank 32 is coupled to pump 148 via hydraulic line 146. Pump 148 is in turn coupled to accumulators 152 and 154 via hydraulic line 150. Accumulators 152 and 154 are coupled to brake opening 202 defined in brake cylinder 162 of valve assembly 142 via high pressure line 156 (also see FIGS. 6–8). Therefore, the operation pressure generated by pump 148 is transmitted to brake opening 202 of valve assembly 142 via a fluid path which includes hydraulic line 150, accumulators 152 and 154, and high pressure line 156. Tank port 198 defined in brake cylinder 162 of valve assembly 142 is coupled to tank 32 via drain line 158 (also see FIGS. 6–8). Transmission opening 200 defined in brake cylinder 162 of valve assembly 142 is coupled to tank 32 via tank line 160 (also see FIGS. 6–8).

In addition, it should be understood that brake opening 226 defined in brake cylinder 162 of valve assembly 142 is coupled to force applying portion 104 of braking system 9 (see FIG. 1) via conduit 130. (Note that brake opening 226 is not shown coupled to conduit 130 in FIG. 8 for clarity of description.) Transmission opening 210 defined in brake cylinder 162 of valve assembly 142 is coupled to hydrostatic transmission 10 via signal line 30 as shown in FIG. 5. (Note that transmission opening 210 is not shown coupled to signal line 30 in FIG. 8 for clarity of description.)

INDUSTRIAL APPLICABILITY

During the operation of power brake apparatus 140 movable assembly 230 is maintained in the first position (see FIG. 6) by the force of springs 174 and 212 urging movable assembly 230 in a direction indicated by arrow 234. Having movable assembly 230 located in the first position aligns groove 182 of upper spool 178 with tank port 198 and brake opening 226 (see FIG. 8). Having groove 182 aligned with tank port 198 and brake opening 226 (see FIG. 8) places brake chamber 118 (see FIG. 4) in fluid communication with tank 32 via a fluid path defined by drain line 158, tank port 198, groove 182 (see FIG. 6), brake opening 226, and conduit 130 (see FIGS. 5 and 6). Therefore, any relatively high pressure hydraulic fluid present in brake chamber 118 will flow out of brake chamber 118 through conduit 130, brake opening 226, groove 182, tank port 198 and into drain line 158. The high pressure hydraulic fluid then travels through drain line 158 in a direction indicated by arrows 242 (see FIGS. 5 and 6) to tank 32. The draining of any relatively high pressure hydraulic fluid from brake chamber 118 results in fluid pressure within brake chamber 118 decreasing so that brake pads 120 (see FIG. 4) positioned within brake chamber 118 are moved away, and are disengaged from, brake disk 126. It should be appreciated that having brake pads 120 disengaged from brake disk 126 allows the wheel associated with brake disk 126 to freely rotate and thus facilitates the movement of the vehicle.

As shown in FIG. 6, having movable assembly 230 located in the first position also aligns blocking portion 240 of lower spool 204 with transmission opening 210. Having blocking portion 240 aligned with transmission opening 210 prevents fluid communication between signal line 30 and tank 32, and thus prevents hydraulic fluid from signal line 30 entering tank 32 to create a pressure drop in signal line 30. Preventing a pressure drop in signal line 30 allows hydrostatic transmission 10 (see FIG. 1) to propel a vehicle (not shown) to a desired speed, in a manner well known in the art.

In order to stop or slow down the vehicle (i.e. cause brake pads 120 to engaged brake disk 126) the operator of the vehicle depresses foot pedal 11 such that shaft 168 is moved in a direction indicated by arrow 246 (see FIG. 7). Moving shaft 168 in the direction indicated by arrow 246 also moves plunger 166 in the same direction which in turn causes spring 174 and inner spring 186 to compress (see FIG. 7). The compression of inner spring 186 urges alignment member 176 in the direction of arrow 246. The force resulting from urging alignment member 176 in the direction of arrow 246 is transmitted to upper spool 178 via roller bearing 184 which in turn causes upper spool 178 and lower spool 204 to move in the direction indicated by arrow 246. It should be appreciated that roller bearing 184 allows alignment member 176 to rotate relative to upper spool 178 (e.g. in the directions indicated by arrow 248) and thus accommodate any relative rotational movement therebetween.

Moving the aforementioned components of movable assembly 230 in the above described manner locates movable assembly 230 in the second position as shown in FIG.

7. It should be appreciated that having movable assembly 230 located in the second position (i) aligns groove 182 of upper spool 178 with brake opening 202 and brake opening 226, and (ii) aligns blocking portion 238 of upper spool 178 with tank port 198. Having groove 182 aligned with brake opening 202 (see FIG. 7) and brake opening 226 (see FIG. 8) places brake chamber 118 (see FIG. 4) in fluid communication with high pressure line 156 via a fluid path defined by brake opening 202, grove 182, brake opening 226, and conduit 130. Therefore, the relatively high pressure hydraulic fluid present in high pressure line 156 will flow out of high pressure line 156 through brake opening 202, groove 182, brake opening 226, conduit 130 and into brake chamber 118. It should also be understood that having groove 182 aligned with brake opening 202 allows high pressure hydraulic fluid from high pressure line 156 to pass through port 218 and return channel 216 and thus facilitates the movement of lower spool 204 in the direction indicated by arrow 246. It should also be understood that having blocking portion 238 aligned with tank port 198 prevents any fluid communication between tank port 198 and high pressure line 156, therefore substantially all the high pressure hydraulic fluid provided by high pressure line 156 is directed to brake chamber 118. As a result of the movement of the high pressure hydraulic fluid in the above described manner, fluid pressure within the brake chamber 118 increases so that the brake pads 120 are forced against the brake disk 126. Since brake disk 126 is linked to a wheel (not shown) of the vehicle (not shown) in a conventional manner, forcing brake pads 120 against brake disk 126 will reduce the travel speed of the vehicle (not shown).

It should also be appreciated that having movable assembly 230 located in the second position aligns groove 206 of lower spool 204 with transmission opening 200 and transmission opening 210. Having groove 206 aligned with transmission opening 200 (see FIG. 7) and transmission opening 210 (see FIG. 8) places signal line 30 (see FIG. 5) in fluid communication with tank 32 via a fluid path defined by transmission opening 210, groove 206, transmission opening 200, and tank line 160. Therefore, the relatively high pressure hydraulic fluid present in signal line 30 will flow out of signal line 30 through transmission opening 210, groove 206, transmission opening 200, tank line 160, and into tank 32. It should be understood that causing high pressure hydraulic fluid to move out of signal line 30 in the above described manner creates a pressure drop in signal line 30 downstream of the orifice 34 of hydrostatic transmission 10 (see FIG. 1). This reduction of the pressure in signal line 30 causes hydrostatic transmission 10 to be destroked (or neutralized) in the same manner as described above in reference to FIGS. 1–4 and therefore causes the vehicle to reduce its speed.

It should be appreciated that movement of movable assembly 230 from the first position to the second position as a result of force being applied to foot pedal 11 (see FIG. 5) provides two functions. Firstly, it causes destroking (or neutralization) of the hydrostatic transmission 10 as described above. Secondly, it causes brake pads 120 to be forced against brake disk 126, also as described above. Both of these events cause the vehicle to slow down or stop. Once the force is removed from foot pedal 11 movable assembly 230 returns to the first position as a result of the force applied by springs 174 and 212 and the vehicle can be moved again.

An important aspect of the present invention is that as movable assembly 230 is moved from the first position to the second position, groove 206 of lower spool 204 becomes aligned with transmission openings 200 and 210 prior to groove 182 of upper spool 178 becoming aligned with brake openings 202 and 226. This is important because this will ensure that neutralization of hydrostatic transmission 10 will occur at a point in time prior to brake pads 120 being forced against the brake disk 126. Consequently, this will prevent hydrostatic transmission 10 from operating to propel the vehicle forward at the same time the power brake apparatus 140 is attempting to slow down the speed of the vehicle. Accordingly, excessive wear and deterioration of brake pads 120 will be prevented.

Another important aspect of the present invention is that as movable member 230 is moved from the first position to the second position, a modulation of force applying portion 104 and hydrostatic transmission 10 occurs. In particular, as movable member 230 is moved from the first position to the second position, force applying portion 104 is gradually actuated such that brake pads 120 are progressively forced against brake disk 126 until movable member 230 is located at the second position where force applying portion 104 is fully actuated and brake pads 120 are maximally forced against brake disk 126. The same modulation occurs with respect to hydrostatic transmission 10, that is as movable member 230 is moved from the first position to the second position, hydrostatic transmission 10 is gradually or progressively destroked until movable member 230 is located at the second position where hydrostatic transmission 10 is fully destroked (i.e. completely neutralized). Therefore, it should be understood that the braking apparatus of the present invention allows an operator to gradually stop or slow down the vehicle.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, while the braking apparatus of the present invention has been described as having a brake cylinder which includes a first and second opening defined therein which cooperates with a channel defined in the piston in order to coordinate the destroking of the hydrostatic transmission with the actuation of the piston, other arrangements are contemplated. One such arrangement would include a first sensor integrated into the piston 114 and a second sensor integrated into a wall of the brake cylinder 108. A solenoid could be provided which would remain inactivated when the first sensor and the second sensor are spaced apart from each other by an operatively significant distance. Then, when the first sensor and the second sensor become positioned close in proximity to each other (e.g. positioned adjacent to each other) by movement of the piston 114 within the brake cylinder 108, the solenoid could be activated. Activation of the solenoid could cause a valve to be opened which would allow the hydrostatic transmission to bleed off pressure from the signal line thereby causing the hydrostatic transmission to be destroked in a manner similar to that hereinbefore described.

Moreover, it should be appreciated that while the braking apparatus of the present invention has been described as utilizing a decrease in hydrostatic pressure to signal the hydrostatic transmission to destroke itself, it is also possible that an increase in hydrostatic pressure could be utilized to signal the hydrostatic transmission to destroke itself.

In addition, while the braking apparatus of the present invention has been described as having a force applying portion which utilizes a disk brake arrangement, the force applying portion may alternatively utilize another arrangements such as a drum brake arrangement.

What is claimed is:

1. A braking apparatus, comprising:
    a brake cylinder having (i) a first brake opening and a second brake opening defined therein, said first brake opening adapted to allow a flow of brake fluid to enter said brake cylinder and said second brake opening adapted to allow said flow of brake fluid to exit said brake cylinder, and (ii) a first transmission opening and a second transmission opening defined therein, said first transmission opening adapted to allow a flow of transmission fluid to enter said brake cylinder and said second transmission opening adapted to allow said flow of transmission fluid to exit said brake cylinder; and
    a movable member located within said brake cylinder, said movable member being positionable between a first position and a second position,
    wherein said first brake opening and said second brake opening are each spaced apart from each of said first transmission opening and said second transmission opening,
    wherein said movable member (i) prevents fluid communication between said first brake opening and said second brake opening when located in said first position, and (ii) allows fluid communication between said first brake opening and said second brake opening when located in said second position, and
    wherein said movable member further (i) prevents fluid communication between said first transmission opening and said second transmission opening when located in said first position, and (ii) allows fluid communication between said first transmission opening and said second transmission opening when located in said second position.

2. The braking apparatus of claim 1, wherein movement of said movable member from said first position to said second position causes a brake member to be forced against a moving object.

3. The braking apparatus of claim 2, wherein:
    said movable member is positioned within said brake cylinder,
    said brake cylinder is in fluid communication with a brake chamber having said brake member located therein, and
    movement of said movable member from said first position to said second position raises fluid pressure within said brake chamber so that said brake member is forced against said moving object.

4. The braking apparatus of claim 3, wherein:
    said brake member is a brake pad, and
    said moving object is a brake disk.

5. The braking apparatus of claim 1, wherein:
    said first transmission opening is in fluid communication with a signal line of a hydrostatic transmission,
    said second transmission opening is in fluid communication with a tank,
    said signal line is in fluid communication with said tank when said movable member is located in said second position, and
    said hydrostatic transmission is neutralized when said signal line is in fluid communication with said tank.

6. The braking apparatus of claim 5, wherein:
    said first brake opening is in fluid communication with a high pressure line of a brake system,
    said second brake opening is in fluid communication with a brake chamber,
    said high pressure line is in fluid communication with said brake chamber when said movable member is located in said second position, and
    a brake member is forced against a moving object when said brake chamber is in fluid communication with said high pressure line.

7. The braking apparatus of claim 6, wherein:
    movement of said movable member from said first position to said second position raises fluid pressure within said brake chamber so that said brake member is forced against said moving object.

8. The braking apparatus of claim 1, wherein:
    said movable member has a brake channel defined therein, and
    said brake channel is aligned with said first brake opening and said second brake opening so as to allow fluid to advance from said first brake opening to said second brake opening through said brake channel when said movable member is located in said second position.

9. The braking apparatus of claim 8, wherein:
    said movable member further has a transmission channel defined therein, and
    said transmission channel is aligned with said first transmission opening and said second transmission opening so as to allow fluid to advance from said first transmission opening to said second transmission opening through said transmission channel when said movable member is located in said second position.

10. A method for reducing travel speed of a vehicle, with said vehicle including (i) a brake cylinder having a first brake opening, a second brake opening, a first transmission opening, and a second transmission opening, and (ii) a movable member which is positioned within said brake cylinder, comprising said steps of:
    moving said movable member to a first position, wherein said movable member (i) prevents fluid communication between said first brake opening and said second brake opening when located in said first position, and (ii) prevents fluid communication between said first transmission opening and said second transmission opening when located in said first position, and
    moving said movable member from said first position to said second position, wherein said movable member (i) allows fluid communication between said first brake opening and said second brake opening when located in said second position, and (ii) allows fluid communication between said first transmission opening and said second transmission opening when located in said second position so that transmission fluid is advanced from a hydrostatic transmission through said first transmission opening and said second transmission opening,
    wherein said first brake opening and said second brake opening are each spaced apart from each of said first transmission opening and said second transmission opening.

11. The method of claim 10 wherein:
    a brake chamber is in fluid communication with said brake cylinder,
    a brake member is positioned within said brake chamber, and
    said step of moving said movable member from said first position to said second position includes said step of raising fluid pressure within said brake chamber so as to force said brake member against a moving object.

12. The method of claim 10, wherein:

said first transmission opening is in fluid communication with a signal line of said hydrostatic transmission, said second transmission opening is in fluid communication with a tank, and said step of moving said movable member from said first position to said second position includes said step of placing said signal line in fluid communication with said tank so as to neutralize said hydrostatic transmission.

13. The method of claim 12, said first brake opening is in fluid communication with a high pressure line of a brake system, said second brake opening is in fluid communication with a brake chamber having a brake member positioned therein, and said step of moving said movable member from said first position to said second position further includes said step of placing said high pressure line in fluid communication with said brake chamber so that fluid pressure within said brake chamber is increased whereby said brake member is forced against a moving object.

14. The method of claim 13, wherein:

said brake member is a brake pad, and said moving object is a brake disk.

15. The method claim 10, wherein:

said movable member has a brake channel defined therein, and moving said movable member from said first position to said second position aligns said brake channel with said first brake opening and said second brake opening so as to allow fluid to advance from said first brake opening to said second brake opening through said brake channel.

16. The method of claim 15, wherein:

said movable member further has a transmission channel defined therein, and moving said movable member from said first position to said second position further aligns said transmission channel with said first transmission opening and said second transmission opening so as to allow fluid to advance from said first transmission opening to said second transmission opening through said transmission channel.

* * * * *